(12) United States Patent
Huang (10) Patent No.: US 12,019,290 B2
(45) Date of Patent: Jun. 25, 2024

(54) EMI SHIELDING COMPONENT, OPTICAL FIBER ADAPTER MODULE HAVING THE SAME, AND METHOD OF ASSEMBLING THE OPTICAL FIBER ADAPTER MODULE

(71) Applicant: CLOUD LIGHT TECHNOLOGY LIMITED, Hong Kong (HK)

(72) Inventor: Chieh-Tse Huang, Hong Kong (HK)

(73) Assignee: Cloud Light Technology Limited, Hong Kong (HK)

( * ) Notice: Subject to any disclaimer, the term of this patent is extended or adjusted under 35 U.S.C. 154(b) by 0 days.

(21) Appl. No.: 17/721,363

(22) Filed: Apr. 15, 2022

(65) Prior Publication Data

US 2023/0333336 A1    Oct. 19, 2023

(51) Int. Cl.
    *G02B 6/42*        (2006.01)
    *G02B 6/25*        (2006.01)

(52) U.S. Cl.
    CPC ........... *G02B 6/4277* (2013.01); *G02B 6/428* (2013.01); *G02B 6/25* (2013.01); *G02B 6/421* (2013.01); *G02B 6/423* (2013.01); *G02B 6/424* (2013.01)

(58) Field of Classification Search
    CPC ................................................... G02B 6/4277
    See application file for complete search history.

(56) References Cited

U.S. PATENT DOCUMENTS

| 6,744,639 | B1 * | 6/2004 | Branch ................. G02B 6/4277 361/753 |
| 2020/0018909 | A1 * | 1/2020 | Chang ..................... G02B 6/421 |
| 2020/0301079 | A1 * | 9/2020 | Leigh .................... G02B 6/3825 |

FOREIGN PATENT DOCUMENTS

CN            102656496 B  *  1/2015   ........... G02B 6/4246

OTHER PUBLICATIONS

Ishii, Machine Translation of CN-102656496-B, Jan. 2015. (Year: 2015).*

* cited by examiner

*Primary Examiner* — Michelle R Connelly
(74) *Attorney, Agent, or Firm* — Harrity & Harrity, LLP (57) ABSTRACT

An EMI shielding component includes: a metallic shielding body having at least one receiving hole, wherein a guide opening is disposed at a lateral edge of the metallic shielding body, is laterally in communication with the receiving hole, and has a width less than the diameter of the receiving hole. An optical fiber adapter module having the EMI shielding component and a method of assembling the optical fiber adapter module are also provided. Therefore, the EMI shielding component can be easily mounted in place, and EMI protection thus achieved is effective.

20 Claims, 7 Drawing Sheets

EMI SHIELDING COMPONENT, OPTICAL FIBER ADAPTER MODULE HAVING THE SAME, AND METHOD OF ASSEMBLING THE OPTICAL FIBER ADAPTER MODULE

BACKGROUND OF THE INVENTION

1. Field of the Invention

The present application relates to optical fiber adapter modules, and in particular to an EMI shielding component, an optical fiber adapter module having the same, and a method of assembling the optical fiber adapter module.

2. Description of the Related Art

A conventional optical fiber adapter module converts optical signals into electrical signals and vice versa. Components associated with electrical signals are vulnerable to electromagnetic interference (EMI), and thus the optical fiber adapter module is enclosed by a metallic casing in multiple directions to protect the components against EMI-induced damage. However, the optical fiber extension direction (i.e., aperture) in which the components associated with electrical signals are exposed lacks effective protection otherwise provided by a metallic casing. As a result, a shielding component must be provided and positioned in such a manner as to be perpendicular to the optical fiber extension direction.

A shielding component with a through-hole is disposed at the aperture of the conventional optical fiber adapter module. The through-hole is penetrable by a fiber stub, allowing the shielding component to pass through the fiber stub from the front end thereof and fit around the fiber stub. However, the front end of the conventional fiber stub is usually connected to another optical apparatus, and in consequence the front end of the fiber stub is so large, rendering it difficult to fit the shielding component around the fiber stub from the front end thereof. On the other hand, a larger through-hole not only precludes effective engagement between the fiber stub and the shielding component in place, but also reduces EMI protection greatly.

BRIEF SUMMARY OF THE INVENTION

An objective of the present application is to provide an EMI shielding component, an optical fiber adapter module having the EMI shielding component, and a method of assembling the optical fiber adapter module.

To achieve at least the above objective, the present application provides an EMI shielding component, comprising: a metallic shielding body having at least one receiving hole, wherein a guide opening is disposed at a lateral edge of the metallic shielding body, is laterally in communication with the receiving hole, and has a width less than the diameter of the receiving hole.

In an embodiment of the present application, the receiving hole and the guide opening are each in the number of two, and two said guide openings correspond in position to two said receiving holes, respectively.

In an embodiment of the present application, the receiving holes are in the number of two, and the metallic shielding body further has a secondary guide opening in communication with two said receiving holes.

In an embodiment of the present application, the EMI shielding component further comprises two engaging elements disposed at two opposing edges of the metallic shielding body, respectively, wherein the engaging elements and the guide openings are located at different edges of the metallic shielding body, respectively.

In an embodiment of the present application, the engaging elements each comprise a resilient arm extending from an edge of the metallic shielding body and an engaging portion disposed at a terminal end of the resilient arm, and the resilient arm is curved.

The present application further provides an optical fiber adapter module comprising: at least one fiber stub; at least one optical fiber with an end insertedly disposed at the fiber stub; at least one ferrule sleeve connected to the fiber stub; and an EMI shielding component comprising a metallic shielding body, wherein the metallic shielding body has at least one receiving hole, with a guide opening disposed at a lateral edge of the metallic shielding body and laterally in communication with the receiving hole, wherein the guide opening, whose width is less than the diameter of the receiving hole, is penetrable by the optical fiber, with the fiber stub penetratingly disposed at the receiving hole.

In an embodiment of the present application, the optical fiber adapter module further comprises an optical fiber receptacle, wherein the fiber stubs, the optical fibers, the ferrule sleeves and the receiving holes are in the number of at least two, respectively, and the optical fiber receptacle is connected to two said fiber stubs.

In an embodiment of the present application, the optical fiber adapter module further comprises a receptacle hind end portion disposed at the periphery of the fiber stub.

In an embodiment of the present application, the optical fiber adapter module further comprises a receptacle grabbing component connected to the optical fiber receptacle.

The present application further provides a method of assembling an optical fiber adapter module, comprising the steps of: moving an optical fiber in the radial direction of a fiber stub of the optical fiber to insert the optical fiber into a receiving hole from a guide opening disposed at a lateral edge of the metallic shielding body; and moving the metallic shielding body in the axial direction of the fiber stub relative thereto until the fiber stub is received in the receiving hole.

Therefore, the EMI shielding component of the present application is inserted into a fiber stub from a lateral side of an optical fiber. Thus, the EMI shielding component does not need an optical fiber receptacle. Therefore, the diameter of a receiving hole can be maximized to improve the structure of the optical fiber adapter module assembled, render it easy to mount the EMI shielding component in place, achieve effective EMI protection, and increase EMI protection coverage.

DETAILED DESCRIPTION OF THE INVENTION

To facilitate understanding of the object, characteristics and effects of this present application, embodiments together with the attached drawings for the detailed description of the present application are provided.

The present application is hereunder illustrated with specific embodiments, depicted with drawings, and described below. Objectives, features, and advantages of the present application are hereunder disclosed to persons skilled in the art. The present application can be implemented or applied in accordance with any other variant embodiments. Various modifications and changes may be made to the details described in the specification from different perspectives and for different applications without departing from the spirit of the present application. The embodiments presented below are illustrative of the technical features of the present application rather than restrictive of the claims of the present application.

Figure 3:
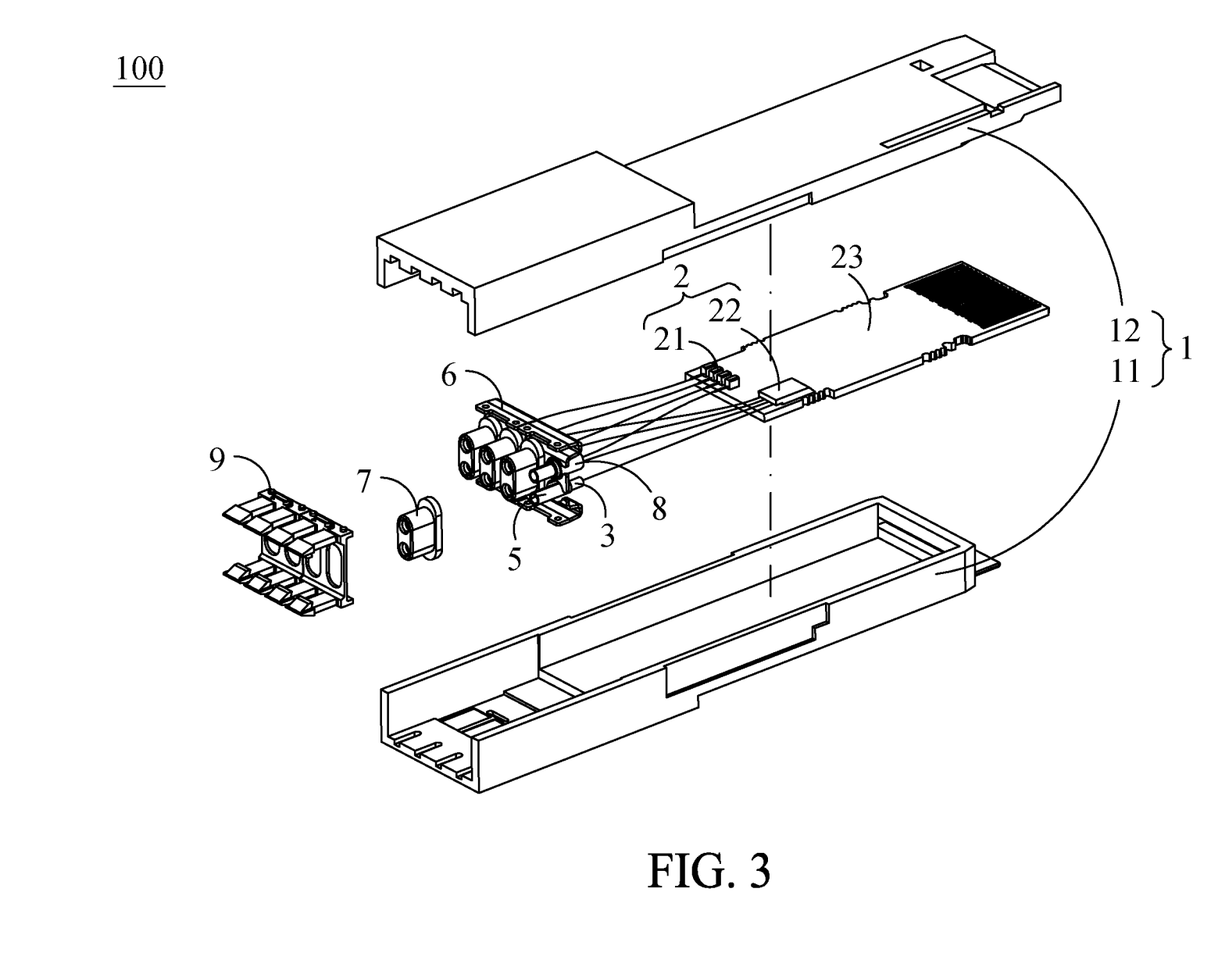
FIG. 3 is an exploded view of an optical fiber adapter module according to an embodiment of the present application.

Referring to FIG. 3, an optical fiber adapter module 100 in an embodiment of the present application comprises a transceiver housing 1, a fiber array 2, at least two fiber stubs 3, at least two optical fibers 4, at least two ferrule sleeves 5 and an EMI shielding component 6.

The transceiver housing 1 comprises a transceiver bottom housing 11 and a top housing 12 and contains the other parts and components of the optical fiber adapter module 100. The transceiver bottom housing 11 and top housing 12 are preferably made of metal or inwardly coated with metal to achieve EMI protection. The structural features of the transceiver housing 1 are subject to changes as needed.

The fiber array 2 converts optical signals from the optical fibers 4 into electrical signals or converts electrical signals into optical signals to be sent out from the optical fibers 4. In this embodiment, the fiber array 2 comprises a transmitter 21 (connectable to a vertical-cavity surface-emitting laser, VCSEL), a receiver 22 (connectable to a photodiode) and a circuit board 23. The transmitter 21 and receiver 22 are each in signal connection with the circuit board 23 and are each connected to an optical fiber 4. The circuit board 23 extends rearward and is in signal connection with any external device in order to receive or transmit signals.

Referring to FIG. 3, part of a receptacle hind end portion 8 is removed to reveal a fiber stub 3. The details of the receptacle hind end portion 8 are described later. The fiber stub 3 is cylindrical and has an axially-located through-hole for containing the optical fiber 4. In this embodiment, the fiber stub 3 is made of ceramic and is chemically stable, abrasion-resistant, and suitable for precision processing.

One end of the optical fiber 4 is insertedly disposed at the fiber stub 3.

Figure 7:
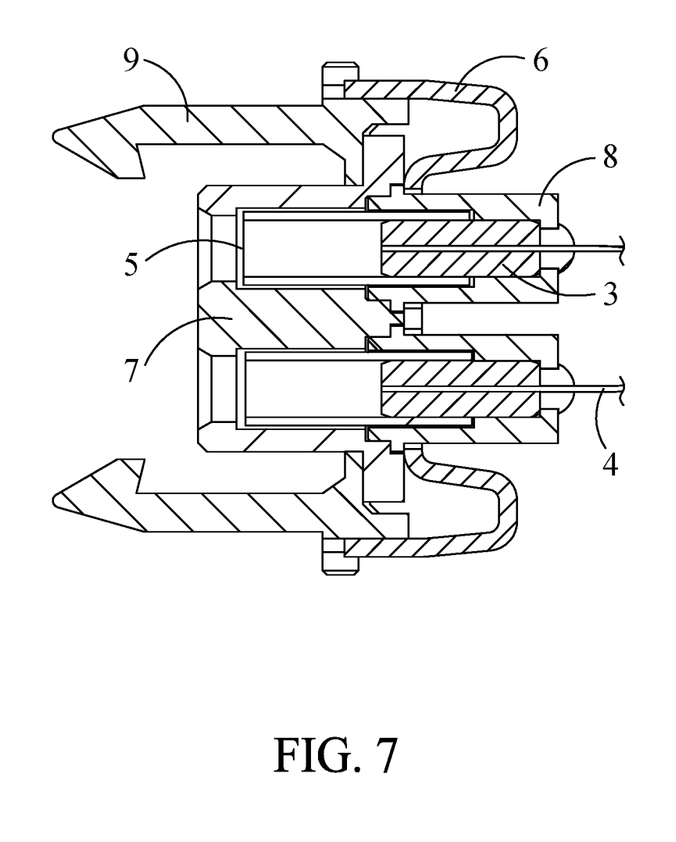
FIG. 7 is a partial cross-sectional view of the optical fiber adapter module according to an embodiment of the present application.

The ferrule sleeve 5 is connected to the fiber stub 3 in axial direction. Referring to FIG. 7, the ferrule sleeve 5 is engaged with another fiber stub so as to be aligned with the optical fiber 4 and connected thereto.

FIG. 3 shows a plurality of fiber stubs 3, optical fibers 4 and ferrule sleeves 5, preferably, at least one fiber stub 3, optical fiber 4 and ferrule sleeve 5 (in the number of two, respectively). The optical fibers 4 are connected to the transmitter 21 and receiver 22, respectively, to receive optical signals from outside and send the optical signals out of the optical fiber adapter module 100. Although each of the aforesaid elements is in the number of four as shown in FIG. 3, the present application is not limited thereto, allowing the number of each of the aforesaid elements to be subject to changes. For instance, in the simplest situation, only one fiber stub 3, one optical fiber 4 and one ferrule sleeve 5 are provided in order to suit the EMI shielding component 6.

Figure 1:
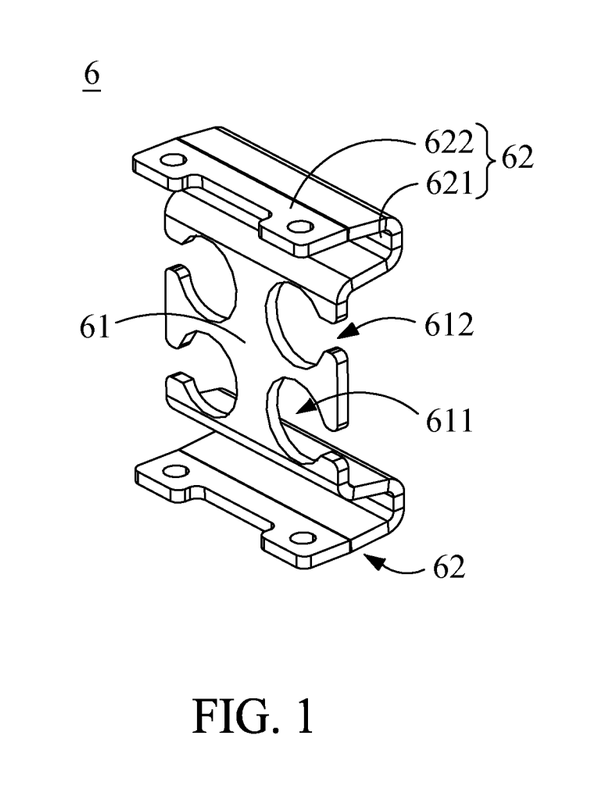
FIG. 1 is a perspective view of an EMI shielding component according to an embodiment of the present application.

FIG. 1 illustrates the fine structures of the EMI shielding component 6. Referring to FIG. 1, the EMI shielding component 6 comprises a metallic shielding body 61, and the metallic shielding body 61 has at least one receiving hole 611. The number of the receiving holes 611 is adjustable according to the numbers/number of the fiber stubs 3 and/or optical fibers 4. A guide opening 612 is disposed at a lateral edge of the metallic shielding body 61. The guide opening 612 is laterally in communication with the receiving hole 611. The guide opening 612, whose width is less than the diameter of the receiving hole 611, is penetrable by the optical fiber 4. The fiber stub 3 is penetratingly disposed at the receiving hole 611.

The process of mounting the EMI shielding component 6 in place is described below. A method of assembling the optical fiber adapter module 100 according to an embodiment of the present application comprises the steps described below.

Figure 4:
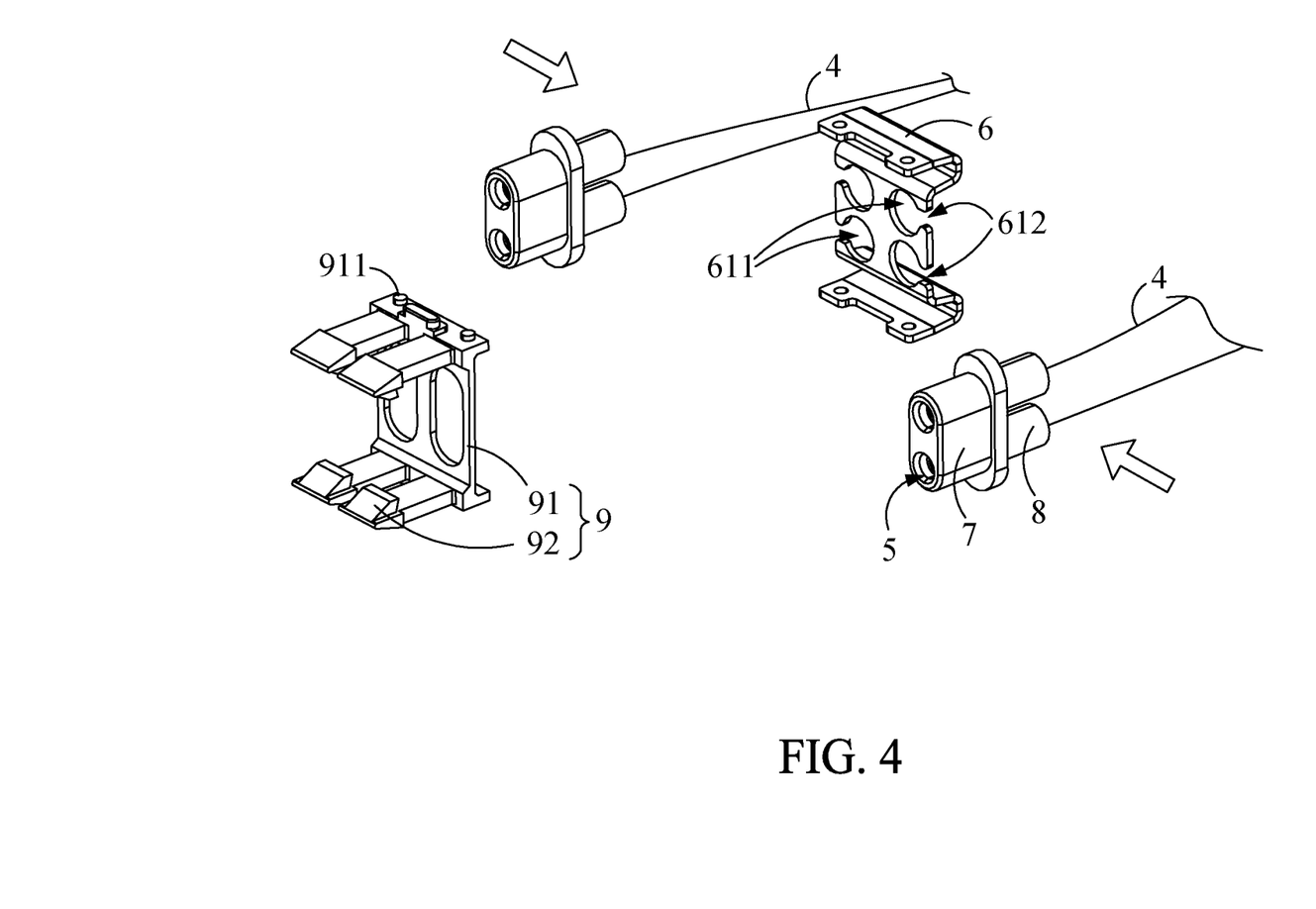
FIG. 4 is a first schematic view of how to assemble the optical fiber adapter module according to an embodiment of the present application.
Figure 8:
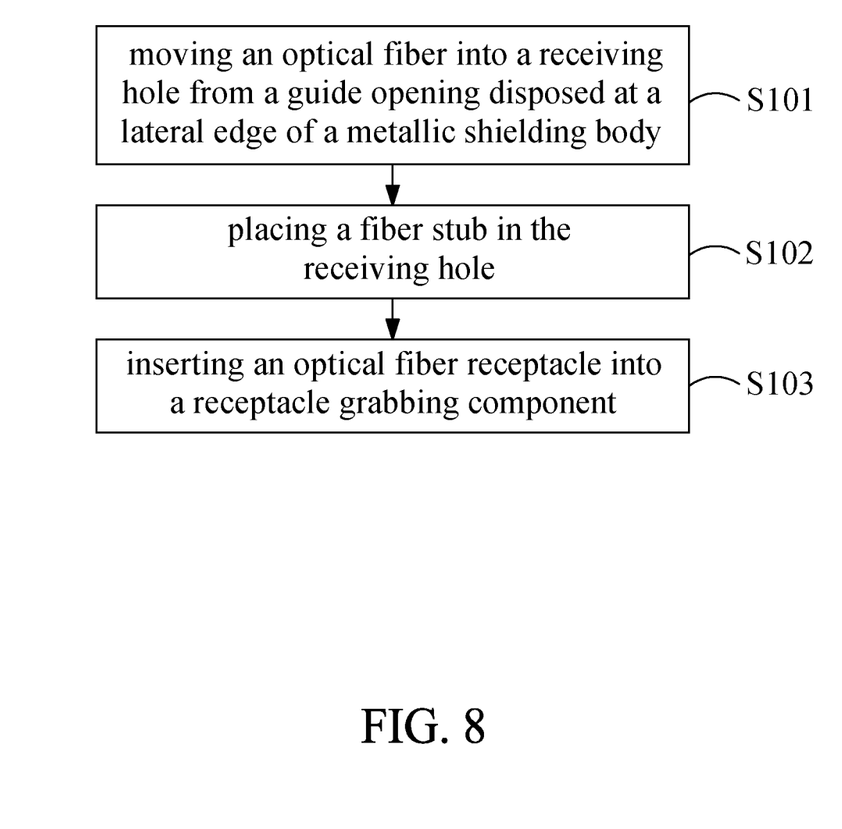
FIG. 8 is a schematic view of the process flow of a method of assembling the optical fiber adapter module according to an embodiment of the present application.

Referring to FIG. 4 and FIG. 8, in step S101, the optical fiber 4 is moved in the radial direction (indicated by the two arrows shown in FIG. 4) of the fiber stub 3 and inserted into the receiving hole 611 from the guide opening 612. At this point in time, one end of the optical fiber 4 is already fixed to the transmitter 21 or receiver 22, and the other end of the optical fiber 4 is already connected to an optical fiber receptacle 7 or a receptacle grabbing component 9 (functions of the optical fiber receptacle 7 and receptacle grabbing component 9 are described later) rendering the insertion of the EMI shielding component 6 from the two ends of the optical fiber 4 difficult. By contrast, the metallic shielding body 61 has the guide opening 612 and the receiving hole 611 in communication with the guide opening 612, allowing the metallic shielding body 61 to be easily inserted from the optical fiber 4 radially.

Referring to FIG. 4 and FIG. 8, in step S102, the metallic shielding body 61 is moved in the axial direction of the fiber stub 3 relative thereto until both the fiber stub 3 and the receptacle hind end portion 8 (disposed at the periphery of the fiber stub 3) are received in the receiving hole 611.

According to the present application, the EMI shielding component 6 is inserted into the fiber stub 3 and the receptacle hind end portion 8 (disposed at the periphery of the fiber stub 3) from the lateral side of the optical fiber 4, such that the EMI shielding component 6 can be directly mounted inside the optical fiber receptacle 7 to improve the structure of the optical fiber adapter module 100 assembled, render it easy to mount the EMI shielding component 6 in place, achieve effective EMI protection, and increase EMI protection coverage.

In this embodiment, as shown in FIG. 1, an EMI shielding component 6 has four receiving holes 611 which suit two optical fibers 4 and two fiber stubs 3, but the present application is not limited thereto. For instance, one EMI shielding component 6 has only two receiving holes 611 which suit one optical fiber 4 and one fiber stub 3. Alternatively, in the simplest situation, one EMI shielding component 6 has only one receiving hole 611 for mounting one optical fiber 4 and one fiber stub 3 in place.

In this embodiment, there is a one-to-one relationship between the receiving hole 611 and the guide opening 612, such that the receiving holes 611 correspond in position to the guide openings 612, respectively. For instance, two receiving holes 611 correspond in position to two guide openings 612, respectively. Alternatively, four receiving holes 611 correspond in position to four guide openings 612, respectively. Preferably, each guide opening 612 is disposed at one of the edges of the metallic shielding body 61, on condition that the edge is nearest to the receiving hole 611 corresponding in position to the guide opening 612.

Figure 2:
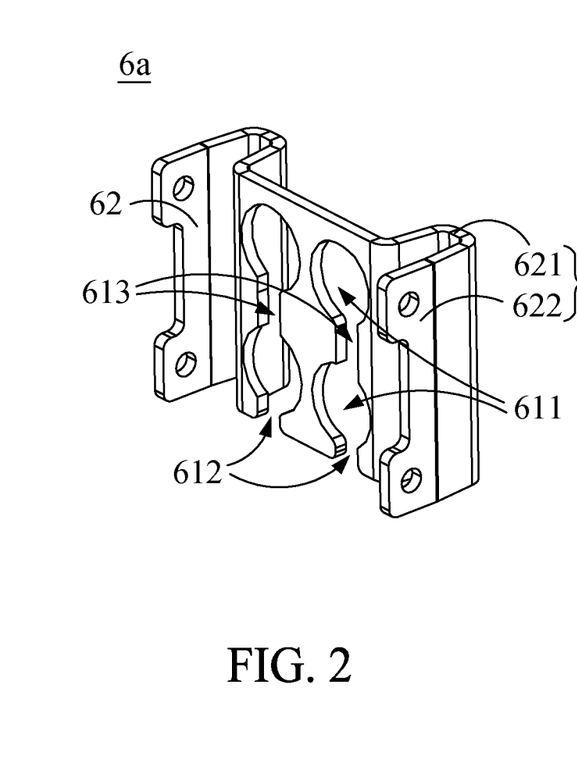
FIG. 2 is a perspective view of the EMI shielding component according to another embodiment of the present application.

However, the present application is not limited thereto. In another embodiment, as shown in FIG. 2, in the metallic shielding body 61 of the EMI shielding component 6a, a secondary guide opening 613 is disposed between every two receiving holes 611. The secondary guide opening 613 is in communication with the two receiving holes 611. Therefore, every two receiving holes 611 share one guide opening 612. Consecutively, two optical fibers 4 pass through the guide opening 612 to enter the first receiving hole 611, and then one of the optical fibers 4 passes through the secondary guide opening 613 to enter the second receiving hole 611. Likewise, a larger number of receiving holes 611 (for example, four, six or eight receiving holes 611) share therebetween one guide opening 612 disposed at an edge of the metallic shielding body 61. The receiving holes 611 are in communication with each other through the secondary guide opening 613 to allow the optical fibers 4 to move into the receiving holes 611, respectively. In the embodiment illustrated by FIG. 1, the guide openings 612 are disposed at the left and right edges of the metallic shielding body 61, respectively. In the embodiment illustrated by FIG. 2, the guide openings 612 are disposed at the lower edge of the metallic shielding body 61. However, the present application is not limited thereto, and thus the edges at which the guide openings 612 are disposed are subject to changes as needed.

Referring to FIG. 1, the EMI shielding component 6 further comprises two engaging elements 62 disposed at two opposing edges of the metallic shielding body 61, respectively. The purpose of the engaging elements 62 is to engage with any other optical apparatuses, and in consequence the EMI shielding component 6 is firmly coupled to the fiber stub 3. Therefore, the positions of the engaging elements 62 must suit the design of the other optical apparatuses, whereas the guide openings 612 must give way to the engaging elements 62 in terms of locations. For example, as shown in FIG. 1, the engaging elements 62 are disposed at the upper and lower edges of the metallic shielding body 61, respectively, whereas the guide openings 612 are disposed at the left and right edges of the metallic shielding body 61, respectively. As shown in FIG. 2, the engaging elements 62 are disposed at the left and right edges of the metallic shielding body 61, respectively, whereas the guide openings 612 are disposed at the lower edge (or upper edge or upper and lower edges) of the metallic shielding body 61.

Referring to FIG. 1 and FIG. 2, the engaging elements 62 each comprise a resilient arm 621 extending from an edge of the metallic shielding body 61 and an engaging portion 622 disposed at the terminal end of the resilient arm 621. The resilient arm 621 is curved and capable of storing resilience potential energy to ensure that optical axes of the fiber stubs 3 in the array thereof are parallel to each other, prevent skewness otherwise caused by assembly tolerance, and maintain effective contact during the conversion process. The engaging portion 622 is engaged with any other optical apparatus and is a recess in this embodiment, but the present application is not limited thereto.

Figure 5:
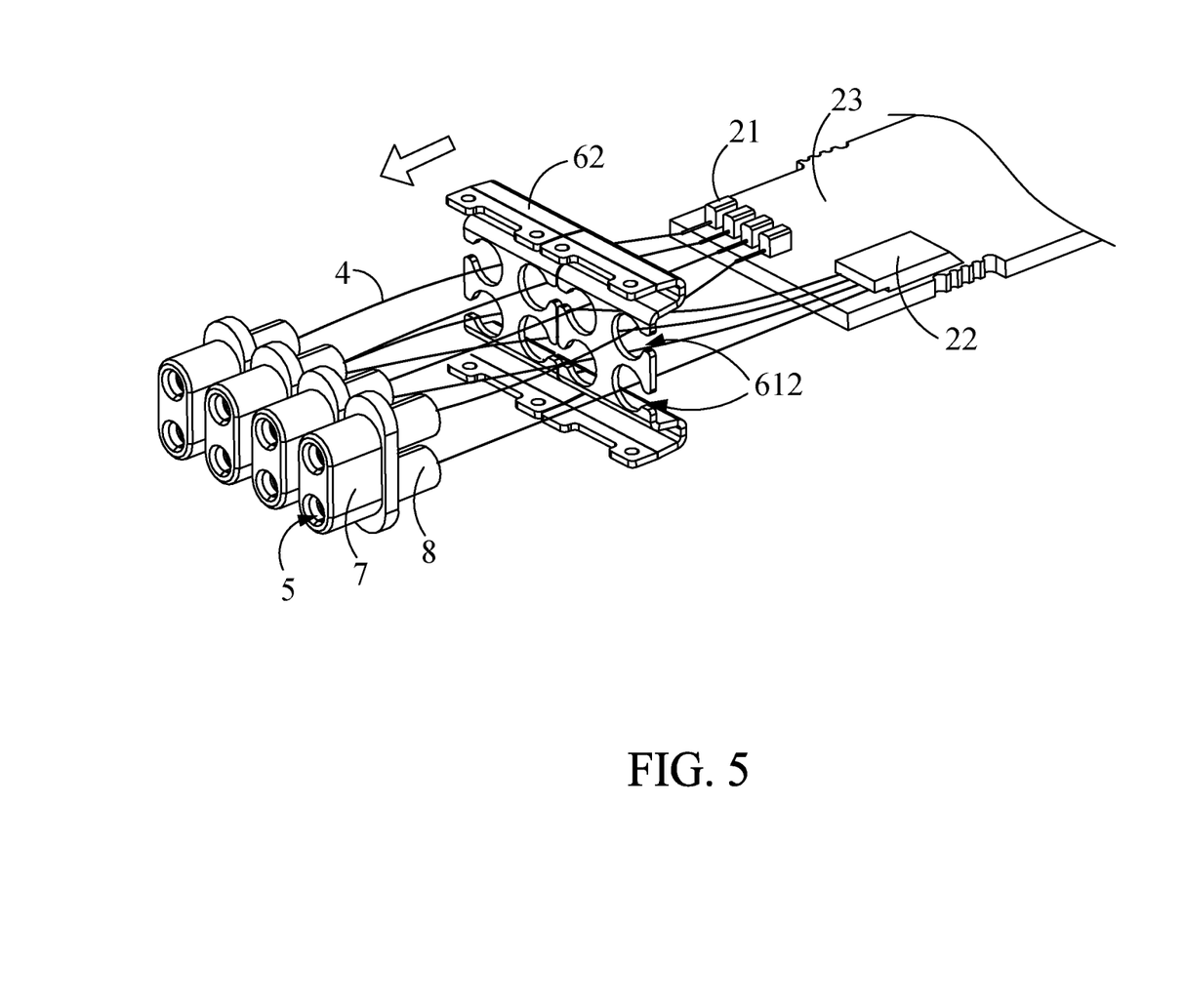
FIG. 5 is a second schematic view of how to assemble the optical fiber adapter module according to an embodiment of the present application.
Figure 6:
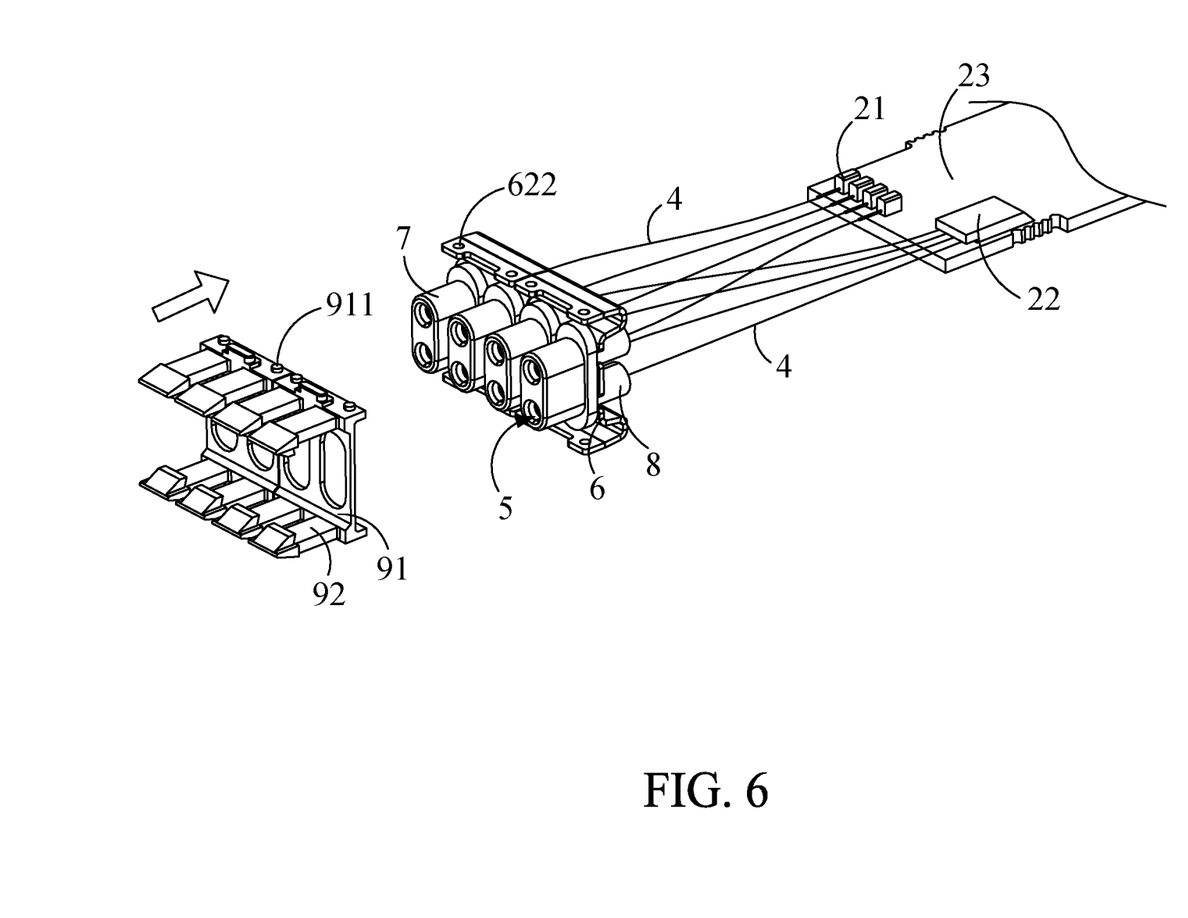
FIG. 6 is a third schematic view of how to assemble the optical fiber adapter module according to an embodiment of the present application.

Referring to FIG. 3 through FIG. 7, the optical fiber adapter module 100 further comprises an optical fiber receptacle 7. The fiber stubs 3, optical fibers 4, ferrule sleeves 5 and receiving holes 611 are in the number of at least two, respectively. The optical fiber receptacle 7 is connected to the two fiber stubs 3 in order to fix one fiber stub 3 and ferrule sleeve 5 in place and thus form a receiving member. FIG. 3 and FIG. 5 show the optical fiber array formed by the optical fiber receptacles 7 arranged side by side.

Referring to FIG. 3 through FIG. 7, the optical fiber adapter module 100 further comprises a receptacle hind end portion 8 disposed at the periphery of the fiber stub 3. The receiving hole 611 matches the outer diameter of the receptacle hind end portion 8. The receptacle hind end portion 8 is preferably made of metal, such as iron. The receptacle hind end portion 8 encloses the fiber stub 3 to a great extent and fills the gap between the fiber stub 3 and the receiving hole 611 to form a continuous shielding surface and thereby further enhance EMI protection effectively.

Referring to FIG. 3 and FIG. 4, the optical fiber adapter module 100 further comprises a receptacle grabbing component 9 connected to the optical fiber receptacle 7. The receptacle grabbing component 9 comprises a frame 91 and a hook 92 extending from the frame 91. The frame 91 is connected to at least one optical fiber receptacle 7 and engaging portion 622 of the engaging elements 62 and fixed to a joint portion 911 on the surface of the frame 91. In this embodiment, the joint portion 911 is a bump which matches and engages with the engaging portion 622 in the shape of a recess. However, the present application is not limited thereto, as the engaging portion 622 and the joint portion 911 can be in any other shapes, and the engaging portion 622 is engaged with the optical fiber receptacle 7 or any other optical apparatus in the absence of the receptacle grabbing component 9. The hook 92 extends in the axial direction of the fiber stub 3 and enables another optical device to be fixed in place and connected; and the optical device has an optical fiber cable.

Therefore, the method of assembling the optical fiber adapter module 100 according to an embodiment of the present application further comprises step S103, which entails inserting the optical fiber receptacle 7 into the receptacle grabbing component 9, thereby completing the assembly process.

While the present application has been described by means of specific embodiments, numerous modifications and variations could be made thereto by those skilled in the art without departing from the scope and spirit of the present application set forth in the claims.

What is claimed is:

1. An optical fiber adapter module, comprising:
   at least one fiber stub;
   at least one optical fiber with an end insertedly disposed at the at least one fiber stub along an axis;
   at least one ferrule sleeve connected to the at least one fiber stub along the axis;
   at least one receptacle hind end portion disposed at a periphery of the at least one fiber stub; and an electromagnetic interference (EMI) shielding component comprising:
a metallic shielding body including:
at least one receiving hole that is configured to receive the at least one fiber stub and the at least one receptacle hind end portion, and
at least one guide opening disposed at a lateral edge of the metallic shielding body and laterally in communication with the at least one receiving hole,
wherein the at least one guide opening has a width that is less than a diameter of the at least one receiving hole, and
wherein the at least one guide opening is penetrable by the at least one optical fiber, and
two engaging elements that are respectively disposed at two opposing edges of the metallic shielding body, the two engaging elements each including:
a resilient arm extending in a first direction along the axis from an edge, of the two opposing edges, of the metallic shielding body, and
an engaging portion extending in a second direction along the axis from a terminal end of the resilient arm,
wherein the second direction is opposite the first direction.

2. The optical fiber adapter module of claim 1, wherein the at least one fiber stub includes two fiber stubs, the at least one optical fiber includes two optical fibers, the at least one ferrule sleeve includes two ferrule sleeves, and the at least one receptacle hind end portion includes two receptacle hind end portions; and
wherein the optical fiber adapter module further comprises an optical fiber receptacle that is connected to the two ferrule sleeves and the two receptacle hind end portions.

3. The optical fiber adapter module of claim 2, further comprising:
a receptacle grabbing component connected to the optical fiber receptacle,
wherein the engaging portion is fixed on the receptacle grabbing component.

4. The optical fiber adapter module of claim 1, further comprising:
an optical fiber receptacle that is configured to receive the at least one ferrule sleeve; and
a receptacle grabbing component that is configured to receive the optical fiber receptacle,
wherein the engaging portion includes a feature that matches and engages with a corresponding feature on the receptacle grabbing component.

5. The optical fiber adapter module of claim 4, wherein the feature is a recess, and the corresponding feature is a bump.

6. The optical fiber adapter module of claim 1, wherein the engaging portion includes a feature that is configured to match and engage with a corresponding feature on another component to secure the optical fiber adapter module to the other component.

7. The optical fiber adapter module of claim 6, wherein the feature is a recess.

8. An electromagnetic interference (EMI) shielding component comprising:
a metallic shielding body including:
at least one receiving hole that is configured to receive at least one fiber stub, and
at least one guide opening disposed at a lateral edge of the metallic shielding body and laterally in communication with the at least one receiving hole,
wherein the at least one guide opening has a width that is less than a diameter of the at least one receiving hole, and
wherein the at least one guide opening is penetrable by at least one optical fiber, and
two engaging elements that are respectively disposed at two opposing edges of the metallic shielding body, the two engaging elements each including:
a resilient arm extending in a first direction along an axis from an edge, of the two opposing edges, of the metallic shielding body, and
an engaging portion extending in a second direction along the axis from a terminal end of the resilient arm,
wherein the second direction is opposite the first direction.

9. The EMI shielding component of claim 8, wherein the engaging portion includes a feature that is configured to match and engage with a corresponding feature on another component to secure the EMI shielding component to the other component.

10. The EMI shielding component of claim 9, wherein the feature is a recess.

11. The EMI shielding component of claim 8, wherein the at least one receiving hole is at least one first receiving hole, the at least one fiber stub is at least one first fiber stub, the at least one guide opening is at least one first guide opening, and the lateral edge is a first lateral edge; and
wherein the metallic shielding body further includes:
at least one second receiving hole that is configured to receive at least one second fiber stub, and
at least one second guide opening disposed at a second lateral edge of the metallic shielding body and laterally in communication with the at least one second receiving hole,
wherein the at least one second guide opening has a width that is less than a diameter of the at least one second receiving hole.

12. The EMI shielding component of claim 11, wherein the at least one first receiving hole includes two first receiving holes, the at least one first fiber stub includes two first fiber stubs, the at least one first guide opening includes two first guide openings, the at least one second receiving hole includes two second receiving holes, the at least one second fiber stub includes two second fiber stubs, and the at least one second guide opening includes two second guide openings.

13. The EMI shielding component of claim 8, wherein the at least one receiving hole is at least one first receiving hole, the at least one fiber stub is at least one first fiber stub, and the at least one guide opening is at least one first guide opening; and
wherein the metallic shielding body further includes:
at least one second receiving hole that is configured to receive at least one second fiber stub, and
at least one second guide opening disposed between the at least one first receiving hole and the at least one second receiving hole,
wherein the at least one second guide opening has a width that is less than a diameter of the at least one second receiving hole.

14. An optical fiber adapter module, comprising:
   at least one fiber stub;
   at least one ferrule sleeve connected to the at least one fiber stub along an axis;
   at least one receptacle hind end portion disposed at a periphery of the at least one fiber stub; and
   an electromagnetic interference (EMI) shielding component comprising:
      a metallic shielding body including:
         at least one receiving hole that is configured to receive the at least one fiber stub and the at least one receptacle hind end portion, and
         at least one guide opening disposed at a lateral edge of the metallic shielding body and laterally in communication with the at least one receiving hole,
            wherein the at least one guide opening has a width that is less than a diameter of the at least one receiving hole, and
      two engaging elements that are respectively disposed at two opposing edges of the metallic shielding body, the two engaging elements each including:
         a resilient arm extending in a first direction along the axis from an edge, of the two opposing edges, of the metallic shielding body, and
         an engaging portion extending in a second direction along the axis from a terminal end of the resilient arm,
            wherein the second direction is opposite the first direction.

15. The optical fiber adapter module of claim 14, further comprising:
   an optical fiber receptacle that is configured to receive the at least one ferrule sleeve; and
   a receptacle grabbing component that is configured to receive the optical fiber receptacle,
      wherein the engaging portion includes a feature that matches and engages with a corresponding feature on the receptacle grabbing component.

16. The optical fiber adapter module of claim 15, wherein the feature is a recess, and the corresponding feature is a bump.

17. The optical fiber adapter module of claim 15, wherein the receptacle grabbing component includes:
   a frame that includes the corresponding feature, and
   at least one hook extending from the frame.

18. The optical fiber adapter module of claim 14, wherein the at least one receiving hole is at least one first receiving hole, the at least one fiber stub is at least one first fiber stub, the at least one guide opening is at least one first guide opening, and the lateral edge is a first lateral edge; and
   wherein the metallic shielding body further includes:
      at least one second receiving hole that is configured to receive at least one second fiber stub, and
      at least one second guide opening disposed at a second lateral edge of the metallic shielding body and laterally in communication with the at least one second receiving hole,
         wherein the at least one second guide opening has a width that is less than a diameter of the at least one second receiving hole.

19. The optical fiber adapter module of claim 18, wherein the at least one first receiving hole includes two first receiving holes, the at least one first fiber stub includes two first fiber stubs, the at least one first guide opening includes two first guide openings, the at least one second receiving hole includes two second receiving holes, the at least one second fiber stub includes two second fiber stubs, and the at least one second guide opening includes two second guide openings.

20. The optical fiber adapter module of claim 14, wherein the at least one receiving hole is at least one first receiving hole, the at least one fiber stub is at least one first fiber stub, and the at least one guide opening is at least one first guide opening; and
   wherein the metallic shielding body further includes:
      at least one second receiving hole that is configured to receive at least one second fiber stub, and
      at least one second guide opening disposed between the at least one first receiving hole and the at least one second receiving hole,
         wherein the at least one second guide opening has a width that is less than a diameter of the at least one second receiving hole.

* * * * *